US009769652B2

(12) United States Patent
Hou et al.

(10) Patent No.: US 9,769,652 B2
(45) Date of Patent: Sep. 19, 2017

(54) METHOD FOR MANAGING ADMINISTRATIVE RELATIONSHIP BETWEEN ACCOUNT AND DEVICE

(71) Applicant: Xiaomi Inc., Beijing (CN)

(72) Inventors: Enxing Hou, Beijing (CN); Mingjun Yin, Beijing (CN); Ziguang Gao, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 40 days.

(21) Appl. No.: 14/979,580

(22) Filed: Dec. 28, 2015

(65) Prior Publication Data

US 2016/0345166 A1  Nov. 24, 2016

(30) Foreign Application Priority Data

May 21, 2015 (CN) .......................... 2015 1 0263489

(51) Int. Cl.
| | |
|---|---|
| *H04L 29/06* | (2006.01) |
| *H04W 8/24* | (2009.01) |
| *H04W 12/06* | (2009.01) |
| *H04W 8/00* | (2009.01) |
| *H04W 8/20* | (2009.01) |
| *H04W 76/02* | (2009.01) |

(52) U.S. Cl.
CPC .............. *H04W 8/24* (2013.01); *H04L 63/08* (2013.01); *H04W 8/005* (2013.01); *H04W 8/205* (2013.01);
(Continued)

(58) Field of Classification Search
CPC ... G06K 7/1417; H04L 12/2816; H04L 51/04; H04L 63/08; H04L 63/0884;
(Continued)

(56) References Cited

U.S. PATENT DOCUMENTS

| | | | |
|---|---|---|---|
| 2009/0077239 A1* | 3/2009 | Kaneko | ................... H04L 41/06 709/227 |
| 2012/0317229 A1 | 12/2012 | Shimakawa | |

(Continued)

FOREIGN PATENT DOCUMENTS

| | | |
|---|---|---|
| CN | 104079543 A | 10/2014 |
| CN | 104202306 A | 12/2014 |

(Continued)

OTHER PUBLICATIONS

"International Search Report for PCT/CN2015/090390".

*Primary Examiner* — Dinh P Nguyen
(74) *Attorney, Agent, or Firm* — Jun He Law Offices P.C.; James J. Zhu (57) ABSTRACT

A method for managing administrative relationship between an account and a device includes: receiving a device binding request sent from a first terminal, the device binding request carrying a device identifier of a target device broadcasted from the target device and a first account identifier corresponding to a first account that the first terminal logs into; determining a second account identifier corresponding to a second account bound with the target device and serving as a primary administrative account for the target device; transmitting a binding inquiry message to a second terminal that logs into the second account, the binding inquiry message carrying the first account identifier and the device identifier; and recording the first account as an auxiliary administrative account for the target device if a first acknowledgement message corresponding to the binding inquiry message is received from the second terminal.

8 Claims, 7 Drawing Sheets

(52) U.S. Cl.
CPC ......... *H04W 12/06* (2013.01); *H04W 76/023* (2013.01); *H04W 76/025* (2013.01); *H04W 76/027* (2013.01); *H04L 63/0884* (2013.01)

(58) Field of Classification Search
CPC ... H04W 12/04; H04W 76/02; H04W 76/023; H04W 76/025; H04W 76/027; H04W 4/005; H04W 8/24; H04W 8/005; H04W 8/205; H04W 12/06
See application file for complete search history.

(56) References Cited

U.S. PATENT DOCUMENTS

| | | | |
|---|---|---|---|
| 2014/0141720 A1* | 5/2014 | Princen | H04L 63/0407 455/41.2 |
| 2014/0208387 A1 | 7/2014 | Ganesh et al. | |
| 2015/0097681 A1* | 4/2015 | Fadell | H04L 67/025 340/628 |

FOREIGN PATENT DOCUMENTS

| | | |
|---|---|---|
| CN | 104519207 A | 4/2015 |
| CN | 104617987 A | 5/2015 |
| JP | 2002-291057 A | 10/2002 |
| JP | 2011-097597 A | 5/2011 |
| JP | 2012-003491 A | 1/2012 |
| JP | 2013-239091 A | 11/2013 |
| JP | 2014-064256 A | 4/2014 |
| JP | 2014-167694 A | 9/2014 |
| RU | 2409853 C2 | 1/2011 |
| WO | 2013/111244 A1 | 8/2013 |

* cited by examiner

METHOD FOR MANAGING ADMINISTRATIVE RELATIONSHIP BETWEEN ACCOUNT AND DEVICE

CROSS-REFERENCE TO RELATED APPLICATIONS

This application is based on and claims priority to Chinese Patent Application No. 201510263489.6, filed on May 21, 2015, the entire contents of which are incorporated herein by reference.

TECHNICAL FIELD

The present disclosure generally relates to electronic technology, and more particularly, to a method for managing administrative relationship between an account and a device.

BACKGROUND

With the rapid development of electronic technology, various kinds of smart devices such as smart refrigerators, smart air conditioners, smart switches and the like emerge. Such smart devices may be controlled by a user via a terminal such as a mobile phone, a personal computer and the like.

Generally, a method for controlling a smart device via the terminal such as a mobile phone may be implemented as follows. Binding relationship between the smart device and a user account is stored on a server. When the smart device is required to be controlled, an administrative request directed to the smart device may be transmitted to the server by a user via the terminal. The server determines whether there is stored a binding relationship between the user account sending the administrative request and the smart device. If yes, the server may instruct the smart device to perform a corresponding process according to the administrative request; otherwise, the server may ignore the administrative request transmitted from the terminal.

Based on the administrative manner described above, a smart device can only be controlled by an account bound with the smart device. For other users who intend to control the smart device via their terminals, it is required to first release the binding relationship between the current account and the smart device and then the other account requests to establish a binding relationship with the smart device, because only the account bound with the smart device can control the smart device. If the original account intends to control the smart device after releasing its binding relationship with the smart device, a similar process needs to be repeated again. Accordingly, it is inefficient to establish an administrative relationship between the device and an account.

SUMMARY

Embodiments of the present disclosure provide a method, a server and a terminal for managing administrative relation between an account and a device. Technical solutions may be provided as follows.

According to a first aspect of the present disclosure, there is provided a method for managing administrative relationship between an account and a device in a server. The method may include: receiving a device binding request sent from a first terminal, the device binding request carrying a device identifier of a target device broadcasted from the target device and a first account identifier corresponding to a first account that the first terminals logs into; determining a second account identifier corresponding to a second account bound with the target device and serving as a primary administrative account for the target device; transmitting a binding inquiry message to a second terminal that logs into the second account, the binding inquiry message carrying the first account identifier and the device identifier; and recording the first account as an auxiliary administrative account for the target device if a first acknowledgement message corresponding to the binding inquiry message is received from the second terminal.

According to a second aspect of the present disclosure, there is provided a method for managing administrative relationship between an account and a device in a terminal. The method may include: receiving a notification message broadcasted from a target device, the notification message carrying a device identifier of the target device; displaying a binding prompt for binding with the target device; and transmitting to a server a device binding request carrying the device identifier of the target device and a first account identifier corresponding to a first account that is logged into locally, if a binding instruction for binding with the target device is received.

According to a third aspect of the present disclosure, there is provided a server for managing administrative relationship between an account and a device, including: a processor; and a memory for storing instructions executable by the processor, wherein the processor is configured to: receive a device binding request sent from a first terminal, the device binding request carrying a device identifier of a target device broadcasted from the target device and a first account identifier corresponding to a first account that the first terminal logs into; determine a second account identifier corresponding to a second account bound with the target device and serving as a primary administrative account for the target device; transmit a binding inquiry message to a second terminal that logs into the second account, the binding inquiry message carrying the first account identifier and the device identifier; and record the first account as an auxiliary administrative account for the target device if a first acknowledgement message corresponding to the binding inquiry message is received from the second terminal.

According to a fourth aspect of the present disclosure, there is provided a terminal for managing administrative relationship between an account and a device, including: a processor; and a memory for storing instructions executable by the processor, wherein the processor is configured to: receive a notification message broadcasted from a target device, the notification message carrying a device identifier of the target device; display a binding prompt for binding with the target device; and transmit to a server a device binding request carrying the device identifier of the target device and a first account identifier corresponding to a first account that is logged into locally, if a binding instruction for binding with the target device is received.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments of the present disclosure are shown by the above drawings, and more detailed description will be made hereinafter. These drawings and text description are not for limiting the scope of the present disclosure concept in any way, but for illustrating the concept of the present disclosure for those skilled in the art by referring to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The embodiments of the present disclosure provide a method for managing administrative relationship between an account and a device. The method may be implemented by a server, a target device, a first terminal and a second terminal together.

Figure 1:
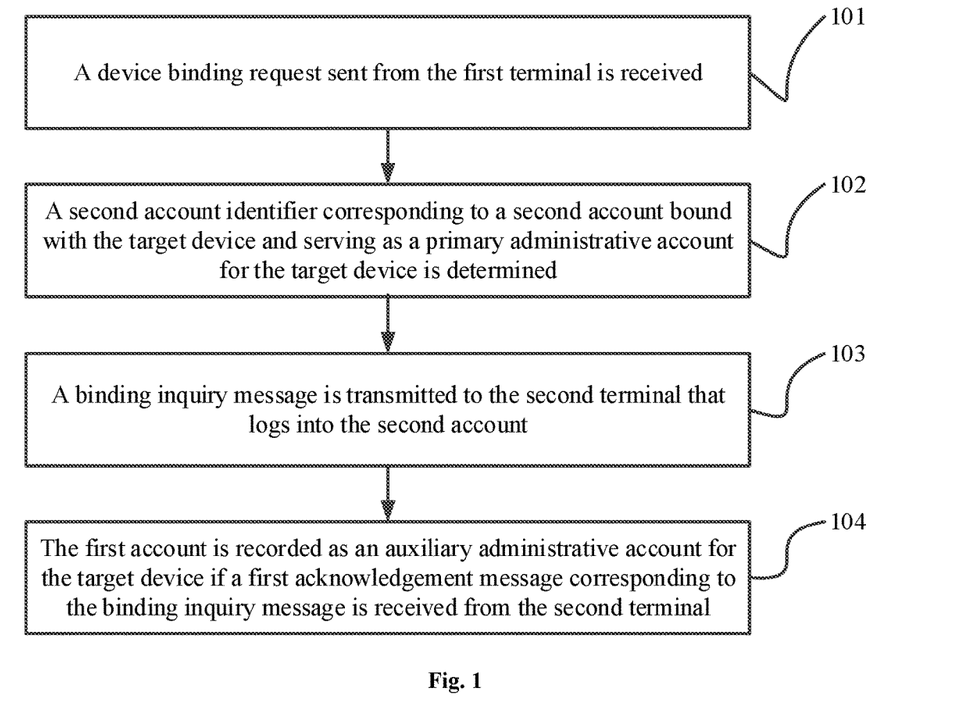
FIG. 1 is a flow chart illustrating a method for managing administrative relationship between an account and a device according to an exemplary embodiment.

As shown in FIG. 1, a process flow of the method implemented by the server may include following steps.

In step 101, a device binding request sent from the first terminal is received. The device binding request carries therein a device identifier of the target device broadcasted from the target device and a first account identifier corresponding to a first account that the first terminal logs into.

In step 102, a second account identifier corresponding to a second account bound with the target device and serving as a primary administrative account for the target device is determined.

In step 103, a binding inquiry message is transmitted to the second terminal that logs into the second account. The binding inquiry message carries therein the first account identifier and the device identifier.

In step 104, the first account is recorded as an auxiliary administrative account for the target device if a first acknowledgement message corresponding to the binding inquiry message is received from the second terminal.

Alternatively, the device binding request may further carry therein at least one of a plurality of administrative authorities over the target device. Alternatively, the binding inquiry message may further carry therein the at least one of the plurality of administrative authorities over the target device.

Figure 2:
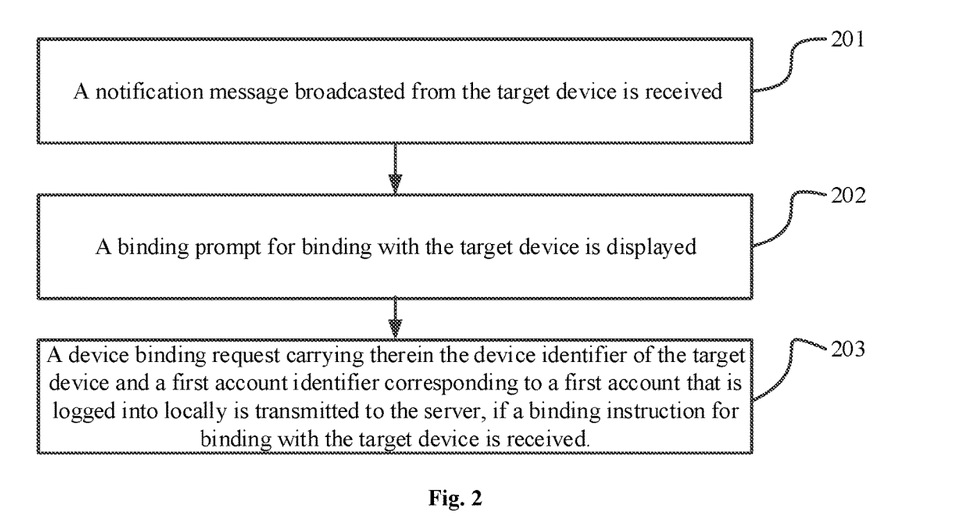
FIG. 2 is a flow chart illustrating a method for managing administrative relationship between an account and a device according to an exemplary embodiment.

As shown in FIG. 2, a process flow of the method implemented by the first terminal may include following steps.

In step 201, a notification message broadcasted from the target device is received, and the notification message carries therein a device identifier of the target device.

In step 202, a binding prompt for binding with the target device is displayed.

In step 203, a device binding request carrying therein the device identifier of the target device and a first account identifier corresponding to a first account that is logged into locally is transmitted to the server, if a binding instruction for binding with the target device is received.

In the embodiment of the present disclosure, the device binding request carrying therein the device identifier of the target device broadcasted from the target device and the first account identifier corresponding to the first account that the first terminal logs into is received from the first terminal. The second account identifier corresponding to the second account bound with the target device and serving as the primary administrative account for the target device is determined. The binding inquiry message carrying therein the first account identifier and the device identifier is transmitted to the second terminal that logs into the second account. Then the first account is recorded as the auxiliary administrative account for the target device if the first acknowledgement message corresponding to the binding inquiry message is received from the second terminal. In this way, additional accounts other than the primary administrative account for the target device may serve as auxiliary administrative accounts for the target device. Accordingly, it is unnecessary to perform operations of binding and releasing binding frequently, even if there is a demand for controlling the target device by a plurality of accounts. Thus, it is more efficient to establish the administrative relationship between the device and accounts.

Figure 3:
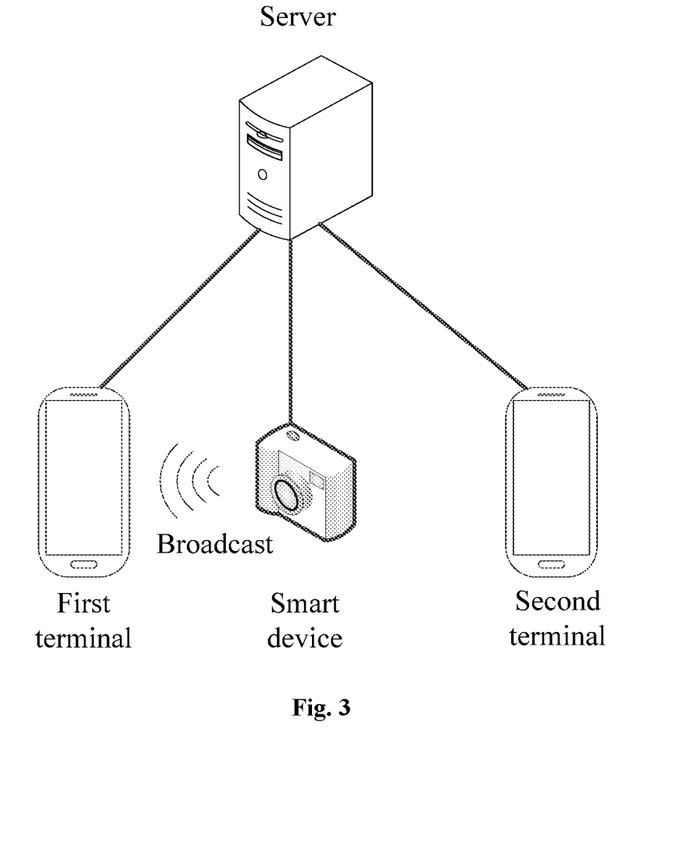
FIG. 3 is a block diagram illustrating a system according to an exemplary embodiment.

The embodiments of the present disclosure further provide a method for managing administrative relationship between an account and a device. The method may be implemented by a server, a target device, a first terminal and a second terminal together. A block diagram of a corresponding system is illustrated in FIG. 3. Herein, the first or second terminal may be any terminal coupled to the internet, for example, a mobile terminal such as a mobile phone, a tablet computer or the like, with an application program for device management and control installed thereon. The server may be a management server of the target device, and serve as a backend server of the application program. The target device may be a smart device such as a smart air conditioner, a smart air purifier, a smart switch or the like. Accordingly, the server may serve as the management server for one or more kinds of smart devices. In the embodiment, solutions are described in detail with an example where the first and second terminals are mobile phones and the target device is a smart device. Implementations are similarly applied to other examples and will not be elaborated herein.

Figure 4:
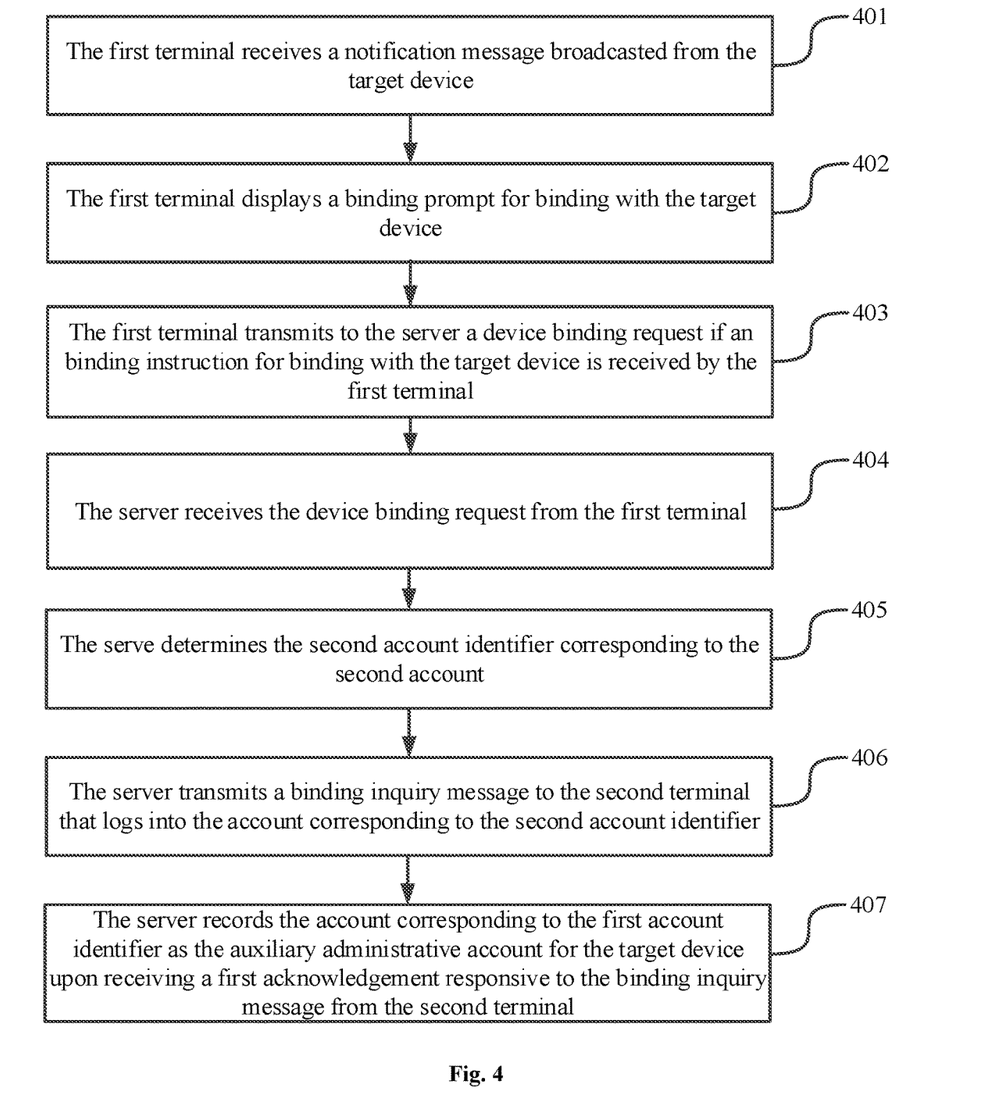
FIG. 4 is a flow chart illustrating a method for managing administrative relationship between an account and a device according to an exemplary embodiment.

As shown in FIG. 4, a process flow of the method may include the following steps.

In step 401, the first terminal receives a notification message broadcasted from the target device, and the notification message carries therein a device identifier of the target device.

Herein, the first terminal may be a terminal that logs into an account other than a primary administrative account bound with the target device, or may be a terminal operated by a visitor who needs to control the target device. The device identifier may be a MAC (Media Access Control) address, or also may be a unique device number assigned by the application program.

In an embodiment, an owner of the target device may register his/her account (i.e. an account corresponding to the second account identifier, named as a second account) by installing the application program on his/her terminal (i.e. the second terminal), and perform a binding operation between the second account and the target device via the application program, so that a binding relationship between a device identifier of the target device and the second account identifier may be stored in the server and the second account may be recorded as a primary administrative account for the target device by the server.

When an additional user (possibly a family member or a friend of the owner) wants to control the target device via his/her terminal (i.e. the first terminal), he/she may also install the application program on his/her terminal and register his/her own account (i.e. an account corresponding to the first account identifier, named as a first account). The first account identifier may be the account registered in the application program.

The target device may be configured in advance to broadcast a notification message in response to certain designated operation on a certain button. The notification message is used to enable the target device to be detectable by those terminals having the application program installed thereon, and may carry the device identifier of the target device. For example, the target device may be configured to broadcast the notification message in response to a long press on certain function button of the target device. Moreover, the notification message may further carry therein the second account identifier corresponding to the primary administrative account bound with the target device, and may further carry therein a device type of the target device. The notification message may be in form of a beacon message.

In step 402, the first terminal displays a binding prompt for binding with the target device.

Figure 5:
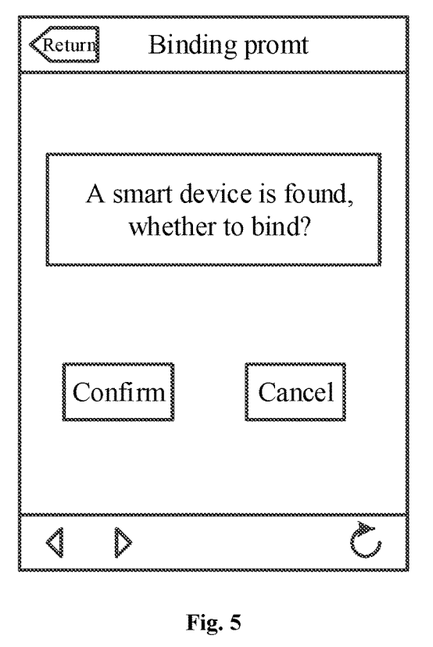
FIG. 5 is a schematic diagram illustrating a user interface according to an exemplary embodiment.

In an embodiment, upon receiving the notification message broadcasted by the target device at the first terminal, the application program may be triggered to pop up a corresponding binding prompt page. As shown in FIG. 5, the binding prompt for binding with the target device, for example, "a smart device is found, whether to bind", is displayed in the binding prompt page to prompt the user to perform binding operation with the smart device. A confirm key and a cancel key are further displayed in the binding prompt page so that the user may be able to decide whether to request binding operation with the target device according to the binding prompt.

Alternatively, for the convenience of the user to select a desirable device to be bound, a device type of the target device may be also displayed on the binding prompt page of the first terminal. Accordingly, the notification message broadcasted by the target device may further include the device type of the target device. Furthermore, the process flow of step 402 may include displaying the binding prompt including the device type of the target device.

In step 403, the first terminal transmits to the server a device binding request carrying therein the device identifier of the target device and the first account identifier corresponding to an account that is logged into locally, if a binding instruction for binding with the target device is received by the first terminal.

In an embodiment, if the confirm key is clicked in the binding prompt page by the user, the first terminal may receive the binding instruction of the first account identifier for binding with the target device. Therefore, the first terminal may be triggered to generate the device binding request carrying therein the device identifier of the target device and the first account identifier corresponding to the account (i.e. the first account) that is logged in locally, and then transmit the device binding request to the server according to a server address prestored in the application program.

Alternatively, in a case that the notification message broadcasted by the target device further carries therein the second account identifier corresponding to the second account bound with the target device and serving as the primary administrative account bound, and the device binding request may further carry therein the second account identifier. Alternatively, the device binding request may further carry therein at least one of a plurality of administrative authorities over the target device.

In step 404, the server receives the device binding request from the first terminal, and the device binding request carries therein the device identifier of the target device broadcasted by the target device and the first account identifier corresponding to the first account that the first terminal logs into.

In an embodiment, after the device binding request is transmitted from the first terminal to the server, it may be received by the server accordingly. Furthermore, the server may parse the device binding request to acquire the device identifier of the target device and the first account identifier carried therein.

In step 405, the serve determines the second account identifier corresponding to the second account, which is bound with the target device and serves as the primary administrative account for the target device.

In an embodiment, the server may further determine the account identifier (i.e. the second account identifier) corresponding to the primary administrative account bound with the target device upon receiving the device binding request from the first terminal.

Alternatively, in a case that the second account identifier corresponding to the second account, which is bound with the target device and serves as the primary administrative account for the target device, is carried in the device binding request, step 405 may be implemented by acquiring the second account identifier carried in the device binding request.

In an embodiment, if the second account identifier corresponding to the second account bound with the target device and serving as the primary administrative account for the target device is also carried in the device binding request received by the server, the server may parse the device binding request to acquire the second account identifier carried therein. The second account identifier is an account identifier corresponding to the second account, which serves as the primary administrative account bound with the target device. Accordingly, the account identifier corresponding to the primary administrative account bound with the target device may be determined directly by the server.

Alternatively, in another case that the second account identifier corresponding to the second account bound with the target device and serving as the primary administrative account for the target device has already been stored in the server and the device identifier of the target device is carried in the device binding request, step 405 may be implemented by acquiring the second account identifier corresponding to the primary administrative account of the target device prestored locally.

In an embodiment, attribute information may be stored by the server for every smart device managed by the server, and such attribute information may include the account identifier of the primary administrative account corresponding to the smart device. After the device binding request is received from the first terminal, the server may parse the device binding request to acquire the device identifier of the target device carried in the device binding request, then retrieve the attribute information of the target device according to the device identifier, and acquire the account identifier (i.e. the second account identifier) corresponding to the primary administrative account.

In step 406, the server transmits a binding inquiry message, which carries therein the first account identifier and the device identifier, to the second terminal that logs into the account corresponding to the second account identifier.

Herein, the binding inquiry message may be a message used for inquiring the terminal that logs into the primary administrative account of the target device regarding whether an auxiliary administrative account is allowed to be bound with.

In an embodiment, after determining the second account identifier corresponding to the primary administrative account bound with the target device, and the server may further determine a terminal (i.e. the second terminal) that logs into the primary administrative account, generate the binding inquiry message carrying therein the second account identifier and the device identifier of the target device, and transmit the binding inquiry message to the second terminal. The binding inquiry message may further carry therein information such as a nickname of the first account. Alternatively, the binding inquiry message may also carry therein at least one of a plurality of administrative authorities over the target device.

In step 407, the server records the account corresponding to the first account identifier as the auxiliary administrative account for the target device, upon receiving a first acknowledgement responsive to the binding inquiry message from the second terminal.

Figure 6:
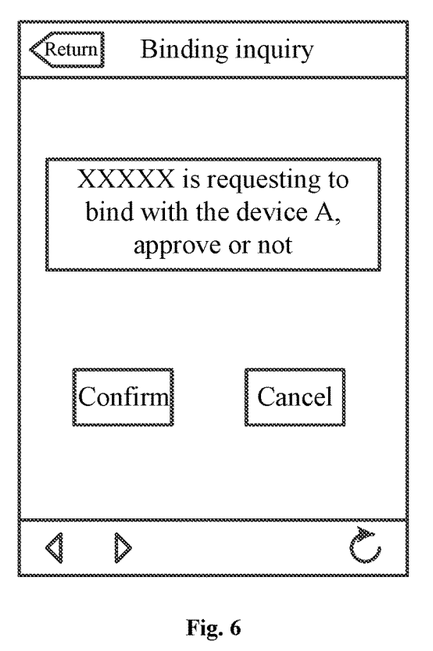
FIG. 6 is a schematic diagram illustrating a user interface according to an exemplary embodiment.

In an embodiment, after the binding inquiry message is transmitted from the server to the second terminal, the message may be received by the second terminal. Accordingly, the application program installed on the second terminal may be triggered to acquire the device identifier in the binding inquiry message, acquire the device type stored locally corresponding the device identifier, and pop up a binding inquiry page. As shown in FIG. 6, an inquiry prompt including the first account identifier and the device type of the target device, for example, "XXXXX is requesting to bind with the device A, approve or not", is displayed on the binding inquiry page, to prompt the owner of the target device (i.e. the user of the second terminal) that the target device is required to be bound by another user. A confirm key and a cancel key may be also displayed on the binding inquiry page, so that the user may decide whether to approve a binding operation between the first account identifier and the target device according to the inquiry prompt. If the confirm key on the binding inquiry page is clicked by the user of the second terminal, the second terminal may be triggered to transmit an acknowledgement message responsive to the binding inquiry message to the server. Upon receiving the acknowledgement message, the server may record the first account identifier in an item of auxiliary administrative accounts included in the attribute information of the target device.

In case that the binding operation between the first terminal and the target device is successfully performed, a successful binding notification message responsive to the device binding request may be transmitted to the first terminal upon receiving the first acknowledgement message responsive to the binding inquiry message from the second terminal. In case that the binding operation between the first terminal and the target device fails, a failed binding notification message responsive to the device binding request may be transmitted to the first terminal if the first acknowledgement message is not received from the second terminal within a preset time period from transmission of the binding inquiry message from the server or if a second acknowledgement message (i.e. a message indicating that the binding operation between the first terminal and the target device is not approved) responsive to the binding inquiry message is received from the second terminal. Accordingly, the successful binding notification message or the failed binding notification message responsive to the device binding request may be received by the terminal from the server.

Alternatively, the target device may be configured with a plurality of administrative authorities, and the user of the second terminal may select an administrative authority to be granted to the user of the first terminal from the plurality of administrative authorities. Accordingly, the acknowledgement message may carry therein at least one administrative authority of the plurality of administrative authorities over the target device. Furthermore, the server may process as follows: recording information indicating that the account corresponding to the first account identifier includes the at least one administrative authority over the target device. Alternatively, the target device may be configured with a plurality of administrative authorities, and the user of the first terminal may select an administrative authority to be request for being granted by the second terminal from the plurality of administrative authorities. Accordingly, at least one administrative authority of the plurality of administrative authorities over the target device may be further carried in the device binding request, and then may be further carried in the binding inquiry message. In this way, the user of the second terminal may decide whether to grant the at least one administrative authority to the user of the first terminal according to information on administrative authorities carried in the binding inquiry message.

In an embodiment, when the server transmits the binding inquiry message carrying the target device identifier to the second terminal, the binding inquiry page generated by the second terminal may be displayed with options for all administrative authorities over the target device. Accordingly, the user of the second terminal may, before clicking the confirm key, select one or more administrative authorities to be shared from the options according to the prompt of the binding inquiry page. Thus, the second terminal may be triggered to transmit to the server an acknowledgement message carrying therein the administrative authorities selected by the user. Upon receiving the acknowledgement message, the server may record the administrative authorities carried in the acknowledgement message into the item of administrative authorities corresponding to the first account identifier included in the attribute information of the target device. For example, administrative authorities over a smart camera may include an authority of viewing images captured by the smart camera (referred to as view permission) and an authority of configuring photographic parameters of the smart camera (referred to as configure permission). If only the view permission is intended to be shared with other users, an option of the view permission may be selected before clicking the confirm key.

Thereafter, the server may transmit to the first terminal a successful binding notification carrying the at least one administrative authority in the acknowledgement message.

Figure 7:
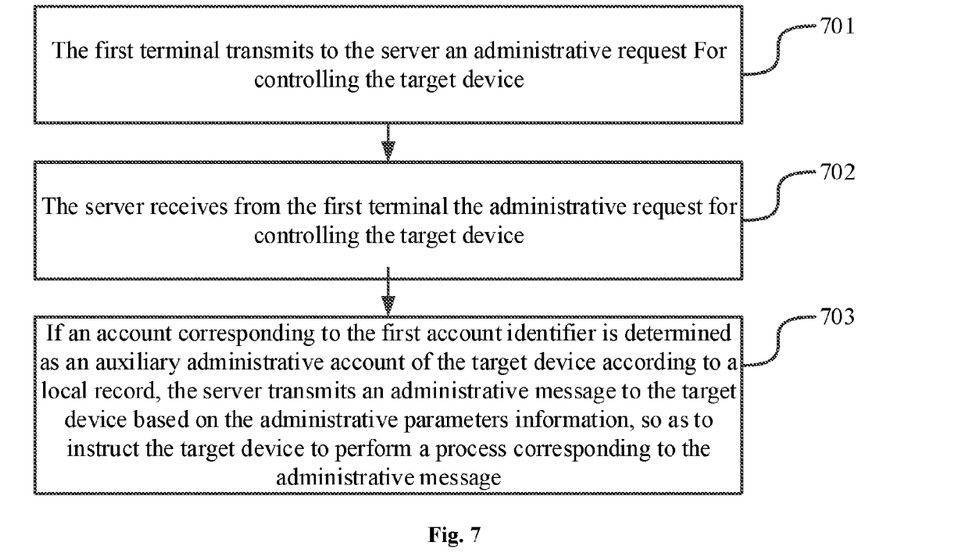
FIG. 7 is a flow chart illustrating a method for managing administrative relationship between an account and a device according to an exemplary embodiment.

In an embodiment of the present disclosure, there is further provided a method for the auxiliary administrative account to control the target device based on the binding process of the auxiliary administrative account described above. As shown in FIG. 7, a corresponding process flow may include following steps.

In step 701, the first terminal transmits to the server an administrative request for controlling the target device, and the administrative request carries therein the first account identifier, the device identifier of the target device and administrative parameter information.

Herein, the administrative parameter information may include information for instructing the device to perform certain operation (e.g. power on, power off, and the like), and may include information such as an operation identifier and the like.

In an embodiment, a device selection page may be provided in the application program. After the first account is recorded as the auxiliary administrative account for the target device, an option of the target device as well as the device type of the target device may be displayed on the device selection page. If the user intends to perform certain control on the target device, he/she may click the option of the target device. Therefore, an operation window may be generated by the application program, and may display certain operation options relating to the target device, such as power on, power off and the like. Accordingly, the user may select an operation to be performed by the target device via the window. Upon selection, the first terminal may generate a corresponding administrative request carrying therein the first account identifier, the device identifier of the target device, and an operation identifier of the operation selected by the user (i.e. the administrative parameter information), and transmit the administrative request for controlling the target device to the server.

For a case described above where the user of the second terminal may select the administrative authorities to be granted to the user of the first terminal from the plurality of administrative authorities, the operation window described above may further display an option corresponding to the one or more administrative authorities carried in the successful binding notification.

In step 702, the server receives from the first terminal the administrative request for controlling the target device, and the administrative request carries therein the first account identifier, the device identifier of the target device and the administrative parameter information.

In an embodiment, upon receiving the administrative request sent from the first terminal, the server may parse the administrative request and acquire the first account identifier, the device identifier of the target device and the administrative parameter information carried therein.

In step 703, if an account corresponding to the first account identifier is determined as the auxiliary administrative account of the target device according to a local record, the server transmits an administrative message to the target device based on the administrative parameter information, so as to instruct the target device to perform a process corresponding to the administrative message.

In an embodiment, upon acquiring the first account identifier and the device identifier carried in the administrative request, the server retrieves attribute information of the target device according to the device identifier and determines whether the account corresponding to the first account identifier is the auxiliary administrative account of the target device based on the attribute information. If the account is determined as the auxiliary administrative account, the server generates a corresponding administrative message according to the administrative parameter information and transmits the administrative message to the target device. Upon receiving the administrative message sent from the server, the target device performs the process corresponding to the administrative message.

In the embodiment of the present disclosure, the device binding request, which carries therein the device identifier of the target device broadcasted from the target device and the first account identifier corresponding to the first account that the first terminal logs into, is received from the first terminal; the second account identifier corresponding to the second account which is bound with the target device and serves as the primary administrative account for the target device is determined. The binding inquiry message, which carries therein the first account identifier and the device identifier, is transmitted to the second terminal that logs into the second account; and then the first account corresponding to the first account identifier is recorded as the auxiliary administrative account for the target device, if the first acknowledgement message corresponding to the binding inquiry message is received from the second terminal. In this way, additional accounts other than the primary administrative account of the target device may serve as auxiliary administrative accounts of the target device. Accordingly, it is unnecessary to perform binding operation and releasing binding operation frequently, even if there is demand for controlling the target device by a plurality of accounts. Thus, it is more efficient to establish the administrative relationship between the device and accounts.

Figure 8:
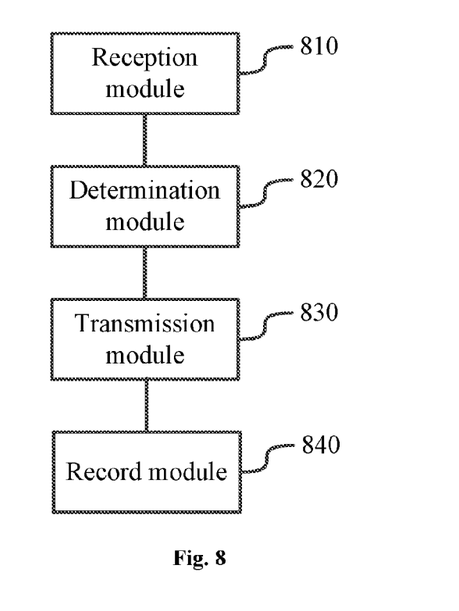
FIG. 8 is a block diagram illustrating a server according to an exemplary embodiment.

Based on the same technical conception, there is provided a server in the embodiments of the disclosure. As shown in FIG. 8, the server includes: a reception module 810 configured to receive a device binding request sent from a first terminal, the device binding request carrying therein a device identifier of a target device broadcasted from the target device and a first account identifier corresponding to a first account that the first terminal logs into; a determination module 820 configured to determine a second account identifier corresponding to a second account bound with the target device and serving as a primary administrative account for the target device; a transmission module 830 configured to transmit a binding inquiry message to a second terminal that logs into the second account, the binding inquiry message carrying the first account identifier and the device identifier; and a record module 840 configured to record the first account as an auxiliary administrative account for the target device if a first acknowledgement message corresponding to the binding inquiry message is received from the second terminal.

Alternatively, the transmission module is further configured to transmit to the first terminal a successful binding notification message responsive to the device binding request if the first acknowledgement message corresponding to the binding inquiry message is received from the second terminal, or transmit to the first terminal a failed binding notification message responsive to the device binding request if the first acknowledgement message is not received from the second terminal within a preset time period from transmission of the binding inquiry message or if a second acknowledgement message responsive to the binding inquiry message is received from the second terminal.

Alternatively, the device binding request further carries therein at least one of a plurality of administrative authorities over the target device; and the binding inquiry message further carries therein the at least one of the plurality of administrative authorities over the target device.

Alternatively, the reception module 810 is further configured to receive an administrative request for controlling the target device sent from the first terminal, and the administrative request carries the first account identifier, the device identifier of the target device and administrative parameter information.

The transmission module 830 is further configured to transmit an administrative message to the target device according to the administrative parameters information, if the first account corresponding to the first account identifier is determined as the auxiliary administrative account for the target device based on a local record, whereby the target device performs a process corresponding to the administrative message.

Alternatively, the first acknowledgement message carries therein at least one administrative authority of a plurality of administrative authorities over the target device, and the record module 840 is further configured to record that the first account corresponding to the first account identifier includes the at least one administrative authority over the target device.

Alternatively, the device binding request further carries therein the second account identifier corresponding to the second account which is bound with the target device and serves as the primary administrative account for the target device; and the determination module 820 is configured to acquire the second account identifier carried in the device binding request.

Alternatively, the determination module 820 is configured to acquire the second account identifier corresponding to the second account bound with the target device and serving as the primary administrative account for the target device.

Figure 9:
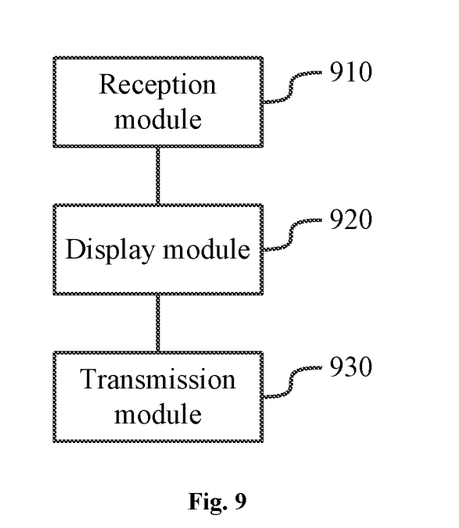
FIG. 9 is a block diagram illustrating a terminal according to an exemplary embodiment.

Based on the same technical conception, there is provided a terminal in the embodiments of the disclosure. As shown in FIG. 9, the terminal includes: a reception module 910 configured to receive a notification message broadcasted from a target device, the notification message carrying therein a device identifier of the target device; a display module 920 configured to display a binding prompt for binding with the target device; and a transmission module 930 configured to transmit to a server a device binding request carrying therein the device identifier of the target device and a first account identifier corresponding to a first account that is logged into locally, if a binding instruction for binding with the target device is received.

Alternatively, the reception module is further configured to receive a successful binding message or a failed binding message sent from the server responsive to the device binding request.

Alternatively, the device binding request further carries therein at least one of a plurality of administrative authorities over the target device.

Alternatively, the transmission module 930 is further configured to transmit to the server an administrative request for controlling the target device, and the administrative request carries therein the first account identifier, the device identifier of the target device and administrative parameter information.

Alternatively, the notification message further carries therein a device type of the target device; and the display module 920 is configured to display the binding prompt including the device type of the target device.

Alternatively, the notification message further carries therein a second account identifier corresponding to a second account bound with the target device and serving as a primary administrative account for the target device. The device binding request further carries therein the second account identifier.

In the embodiment of the present disclosure, the device binding request carrying therein the device identifier of the target device broadcasted from the target device and the first account identifier corresponding to the first account that the first terminal logs into is received from the first terminal. The second account identifier corresponding to the second account bound with the target device and serving as the primary administrative account for the target device is determined. The binding inquiry message carrying therein the first account identifier and the device identifier is transmitted to the second terminal that logs into the second account. Then the first account is recorded as the auxiliary administrative account for the target device if the first acknowledgement message corresponding to the binding inquiry message is received from the second terminal. In this way, additional accounts other than the primary administrative account for the target device may serve as auxiliary administrative accounts for the target device. Accordingly, it is unnecessary to perform operations of binding and releasing binding frequently, even if there is a demand for controlling the target device by a plurality of accounts. Thus, it is more efficient to establish the administrative relationship between the device and accounts.

Based on the same technical conception, there is provided system for managing administrative relationship between an account and a device. The system includes a server, a first terminal and a second terminal.

Herein, the first terminal is configured to receive a notification message broadcasted from a target device, the notification message carrying therein a device identifier of the target device, display a binding prompt for binding with the target device, and transmit to the server a device binding request carrying therein the target identifier of the target device and a first account identifier corresponding to an account that is logged into locally.

The server is configured to receive the device binding request transmitted by the first terminal, determine a second account identifier corresponding to a second account bound with the target device and serving as a primary administrative account for the target device, transmit a binding inquiry message to the second terminal that logs into the second account, the binding inquiry message carrying therein the first account identifier and the device identifier, and record the first account as an auxiliary administrative account for the target device if a first acknowledgement message corresponding to the binding inquiry message is received from the second terminal.

In the embodiment of the present disclosure, the device binding request carrying therein the device identifier of the target device broadcasted from the target device and the first account identifier corresponding to the first account that the first terminal logs into is received from the first terminal. The second account identifier corresponding to the second account bound with the target device and serving as the primary administrative account for the target device is determined. The binding inquiry message carrying therein the first account identifier and the device identifier is transmitted to the second terminal that logs into the second account. Then the first account is recorded as the auxiliary administrative account for the target device if the first acknowledgement message corresponding to the binding inquiry message is received from the second terminal. In this way, additional accounts other than the primary administrative account for the target device may serve as auxiliary administrative accounts for the target device. Accordingly, it is unnecessary to perform operations of binding and releasing binding frequently, even if there is a demand for controlling the target device by a plurality of accounts. Thus, it is more efficient to establish the administrative relationship between the device and accounts.

Figure 10:
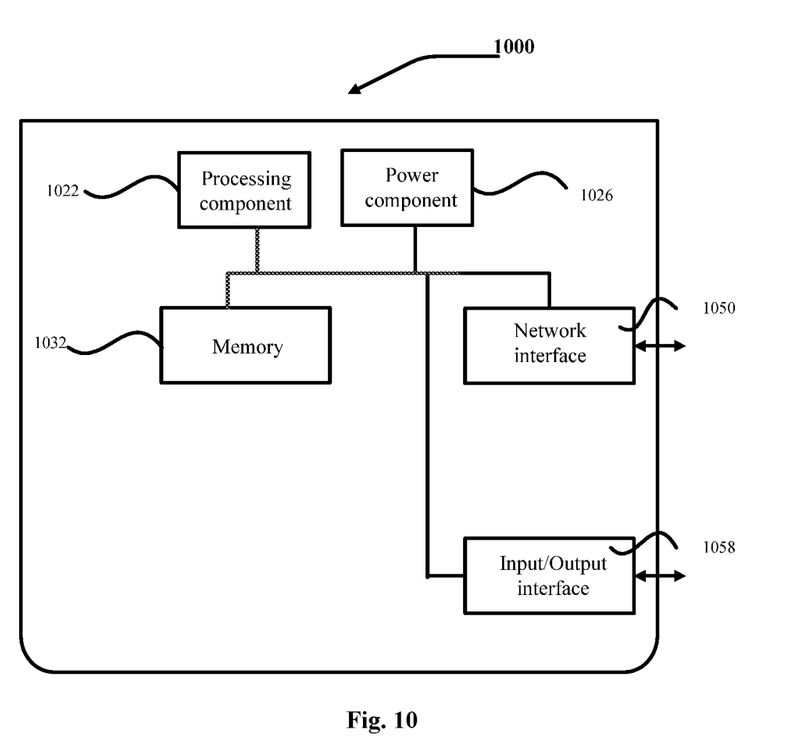
FIG. 10 is a block diagram illustrating a server according to an exemplary embodiment.

FIG. 10 is a block diagram illustrating an apparatus 1000 (such as a server) for managing administrative relationship between an account and a device according to an exemplary embodiment. As shown in FIG. 10, the apparatus 1000 includes: a processing component 1022 which may further include one or more processors, and memory resource represented by a memory 1032 which is configured to store instructions, such as application programs, executable by the processing component 1022. The application programs stored in the memory 1032 may include one or more modules each corresponding to a set of instructions. Furthermore, the processing component 1022 is configured to execute the instructions so as to perform the method described above.

The apparatus 1000 may also include a power component 1026 configured to perform power management of the apparatus 1000, a wired or wireless network interface 1050 configured to connect the apparatus 1000 with a network, and an Input/Output (I/O) interface 1058. Then apparatus 1000 may be operated based on an operating system stored on the memory 1032, such as Windows Server™, Mac OS X™, Unix™, Linux™, FreeBSD™ or the like.

The apparatus 1000 may include: a memory, and one or more programs stored in the memory and configured to be executable by one or more processors. The programs includes instructions for performing the method as illustrated in FIG. 1 and other embodiments, which will not be repeatedly described herein.

There is also provided a terminal according to an exemplary embodiment of the present disclosure. The terminal may be a mobile phone.

Figure 11:
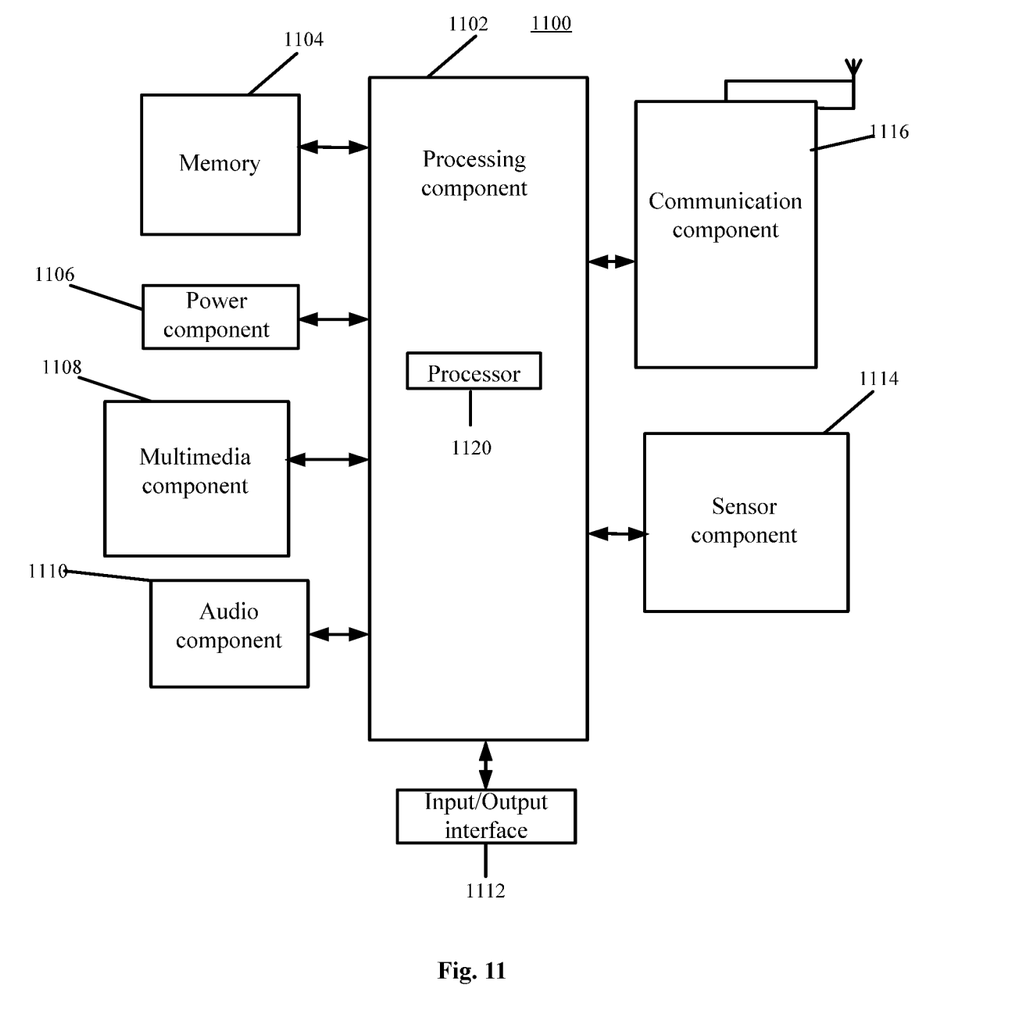
FIG. 11 is a block diagram illustrating a terminal according to an exemplary embodiment.

As shown in FIG. 11, the terminal 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 generally controls overall operations of the terminal 1100, such as operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate interaction between the processing component 1102 and other components. For instance, the processing component 1102 may include a multimedia module to facilitate the interaction between the multimedia component 1108 and the processing component 1102.

The memory 1104 is configured to store various types of data to support the operation of the terminal 1100. Examples of such data include instructions for any application or method operated on the terminal 1100, contact data, phonebook data, messages, pictures, videos, etc. The memory 1104 may be implemented using any type of volatile or non-volatile memory apparatus or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1106 provides power to various components of the terminal 1100. The power component 1106 may include a power management system, one or more power sources, and other components associated with the generation, management, and distribution of power in the terminal 1100.

The multimedia component 1108 includes a screen providing an output interface between the terminal 1100 and the user. In some embodiments, the screen may include a liquid crystal display (LCD) and a touch panel (TP). If the screen includes the touch panel, the screen may be implemented as a touch screen to receive input signal from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1108 includes a front camera and/or a rear camera. The front camera and/or the rear camera may receive an external multimedia datum while the terminal 1100 is in an operation mode, such as a photographing mode or a video mode. Each of the front camera and the rear camera may be a fixed optical lens system or have focus and optical zoom capability.

The audio component 1110 is configured to output and/or input audio signal. For example, the audio component 1110 includes a microphone (MIC) configured to receive external audio signal when the terminal 1100 is in an operation mode, such as a call mode, a recording mode, and a voice identification mode. The received audio signal may be further stored in the memory 1104 or transmitted via the communication component 1116.

The I/O interface 1112 provides an interface between the processing component 1102 and peripheral interface modules, such as a keyboard, a click wheel, a button, or the like. The button may include, but not limited to, a home button, a volume button, a starting button, or a locking button.

The sensor component 1114 includes one or more sensors to provide status assessments of various aspects of the terminal 1100. For instance, the sensor component 1114 may detect an open/closed status of the terminal 1100, relative positioning of components, e.g., the display and the keyboard, of the terminal 1100, a change in position of the terminal 1100 or a component of the terminal 1100, a presence or absence of user contact with the terminal 1100, an orientation or an acceleration/deceleration of the terminal 1100, and a change in temperature of the terminal 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the terminal 1100 and other apparatuses. The terminal 1100 may access a wireless network based on a communication standard, such as WIFI, 2G or 3G or a combination thereof. In one exemplary embodiment, the communication component 1116 receives broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1100 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above method as described in FIG. 2 and other embodiments.

In exemplary embodiments, there is also provided a non-transitory computer readable storage medium including instructions, such as instructions included in the memory 1104, executable by the processor 1120 in the terminal 1100, for performing the above method. For example, the non-transitory computer-readable storage medium may be a ROM, a random access memory (RAM), a CD-ROM, a magnetic tape, a floppy disc, an optical data storage apparatus, or the like.

A non-transitory computer-readable storage medium includes instructions, executable by a processor of the terminal, to enable the terminal to perform a method for managing administrative relation between an account and a device as described in FIG. 2 and other embodiments, which will not be repeatedly described herein.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for managing administrative relationship between an account and a device in a server, comprising:
   receiving a device binding request sent from a first terminal, the device binding request carrying a device identifier of a target device broadcasted from the target device and a first account identifier corresponding to a first account that the first terminal logs into;
   determining a second account identifier corresponding to a second account bound with the target device and serving as a primary administrative account for the target device;
   transmitting a binding inquiry message to a second terminal that logs into the second account, the binding inquiry message carrying the first account identifier and the device identifier; and
   recording the first account as an auxiliary administrative account for the target device if a first acknowledgement message corresponding to the binding inquiry message is received from the second terminal.

2. The method according to claim 1, further comprising:
   transmitting to the first terminal a successful binding notification message responsive to the device binding request, if the first acknowledgement message corresponding to the binding inquiry message is received from the second terminal; and
   transmitting to the first terminal a failed binding notification message responsive to the device binding request, if the first acknowledgement message is not received from the second terminal within a preset time period from transmission of the binding inquiry message or if a second acknowledgement message responsive to the binding inquiry message is received from the second terminal.

3. The method according to claim 1, wherein the device binding request further carries at least one of a plurality of administrative authorities over the target device; and the binding inquiry message further carries the at least one of the plurality of administrative authorities over the target device.

4. The method according to claim 1, further comprising:
   receiving an administrative request for controlling the target device sent from the first terminal, the administrative request carrying the first account identifier, the device identifier of the target device and administrative parameter information; and
   transmitting an administrative message to the target device according to the administrative parameter information, if the first account corresponding to the first account identifier is determined as the auxiliary administrative account for the target device based on a local record, whereby the target device performs a process corresponding to the administrative message.

5. The method according to claim 1, wherein the first acknowledgement message carries at least one administrative authority of a plurality of administrative authorities over the target device; and
   the method further comprises:
   recording information indicating that the first account corresponding to the first account identifier comprises the at least one administrative authority over the target device.

6. The method according to claim 1, wherein the device binding request further carries the second account identifier corresponding to the second account bound with the target device and serving as the primary administrative account for the target device; and
   determining the second account identifier corresponding to the second account bound with the target device and serving as the primary administrative account for the target device comprises: acquiring the second account identifier carried in the device binding request.

7. The method according to claim 1, wherein determining the second account identifier corresponding to the second account bound with the target device and serving as the primary administrative account for the target device comprises:

acquiring the second account identifier corresponding to the second account bound with the target device and serving as the primary administrative account bound for the target device, wherein the second account identifier is locally pre-stored.

8. A server for managing administrative relationship between an account and a device, comprising:

a processor; and a memory for storing instructions executable by the processor, wherein the processor is configured to:

receive a device binding request sent from a first terminal, the device binding request carrying a device identifier of a target device broadcasted from the target device and a first account identifier corresponding to a first account that the first terminal logs into;

determine a second account identifier corresponding to a second account bound with the target device and serving as a primary administrative account for the target device;

transmit a binding inquiry message to a second terminal that logs into the second account, the binding inquiry message carrying the first account identifier and the device identifier; and record the first account as an auxiliary administrative account for the target device if a first acknowledgement message corresponding to the binding inquiry message is received from the second terminal.

\* \* \* \* \*